Dec. 16, 1952     F. MOESINGER, JR     2,622,048
EXTERNAL POWDER SCARFING PROCESS AND APPARATUS
Filed April 18, 1950     3 Sheets—Sheet 2

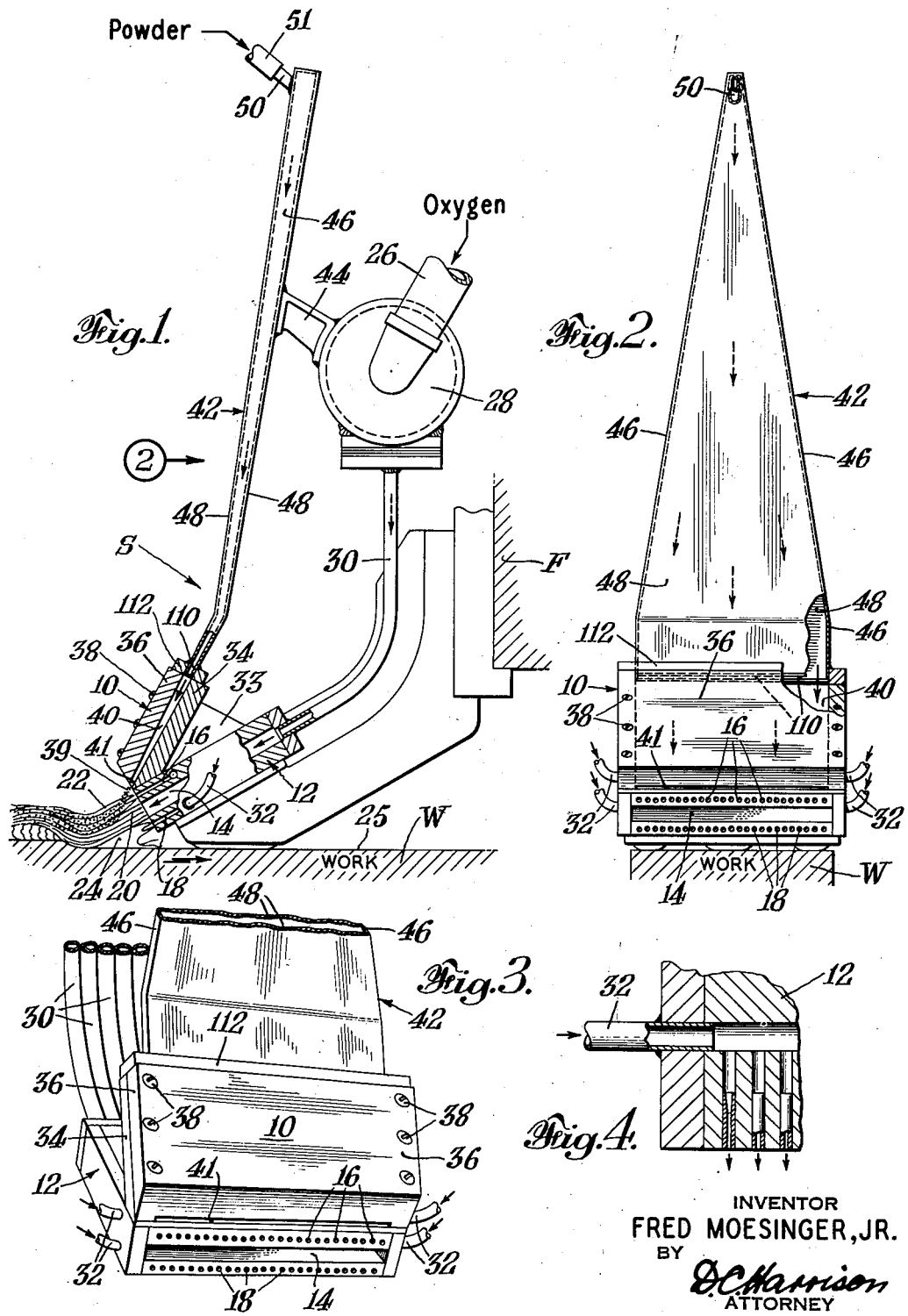

INVENTOR
FRED MOESINGER, JR.
BY
ATTORNEY

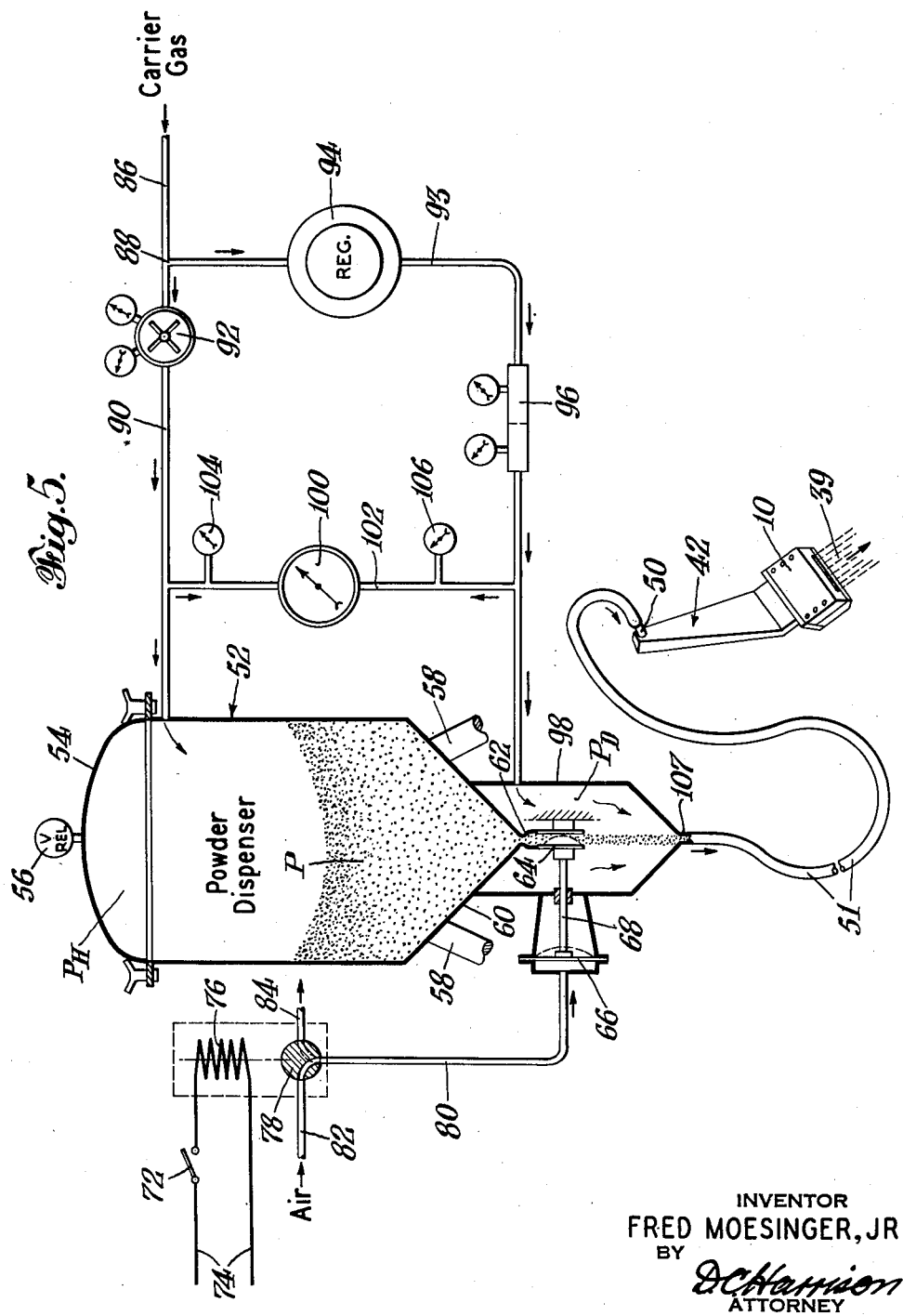

Patented Dec. 16, 1952

2,622,048

UNITED STATES PATENT OFFICE 2,622,048

EXTERNAL POWDER SCARFING PROCESS AND APPARATUS

Fred Moesinger, Jr., Morristown, N. J., assignor, by mesne assignments, to Union Carbide and Carbon Corporation, a corporation of New York Application April 18, 1950, Serial No. 156,652

10 Claims. (Cl. 148—9.5)

This invention relates to thermochemical scarfing, and more particularly to refractory-metal body scarfing with externally fed powdered solid fuel.

In prior attempts to thermochemically scarf stainless steel with the aid of powdered iron, the latter was fed to the reaction zone internally, i. e., along with the scarfing oxygen stream. When internal powder feed equipment was used for scarfing stainless steel slabs, the process was expensive, and the surface quality of products rolled from scarfed slabs was not satisfactory in that a type of defect called a "shiner" was found to have frequent occurrence upon the rolled scarfed product. A "shiner" is a slightly depressed area of higher reflectivity with substantially the same composition as the base material. It is believed that heavy scale rich in admixed iron and possibly covering a metallic deposit on the plate itself is rolled into intimate contact with the underlying metal, thereby protecting it from furnace gases and air. Upon pickling, the thin rolled-in, metallic-scale layer is removed, exposing the protected zone which is the "shiner." Thus, it was necessary to mechanically grind the resulting surface in order to avoid undesirable "shiners" in the final product, thereby considerably increasing the cost. Also, such scarfing involved critical process factors; such as critical powder feed rate, and the resulting cut contours were not subject to satisfactory predetermined control.

In scarfing with an internal fed stream of powder in the past, such stream was usually round. As a result, a relatively deep groove was formed in each scarfing pass, so that it was necessary to subsequently remove considerable metal, which was expensive, in order to obtain a desired relatively flat, scarfed surface. This trouble was accentuated due to the fact that the edges or borders of the groove were uneven, which was highly objectionable. In attempting to scarf with parallel streams of scarfing oxygen containing internally fed powder, in one pass, the adjacent streams interfered with one another, and the resulting scarfed surface had fused powder globules on the ridges between the grooves or cuts, which made the product obviously unacceptable for subsequent rolling.

Another difficulty with prior attempts to scarf stainless steel was due to inherent limitations in the available powder dispensing equipment. Control of the powder flow was restricted to a critical range. Furthermore, a single bleeder valve was used to adjust both the powder carrier gas back-pressure and the carrier gas powder-injector pressure, which objectionably restricted the range of adjustment. The control was critical and the powder flow was non-uniform and limited in quantity.

Also, prior to the invention, powder distribution across a single or a multiple stream scarfing cut was non-uniform, due to the inherent concentration of the powder in the center of a single round stream, as well as non-uniform blending of the powder in adjacent streams.

Prior to the present invention, therefore, it was necessary to mechanically grind or chip stainless steel slabs, for example, to condition the surface for subsequent treatment. This was expensive, slow, and not entirely satisfactory for all grades of stainless steel. Prior attempts to thermochemically scarf stainless steel shapes were even more expensive.

The main object of this invention, therefore, is to provide an improved powder-assisted thermochemical scarfing process which overcomes such problems. Another object of the invention is to provide apparatus for thermochemically scarfing hard-to-scarf metal bodies with the assistance of externally-fed powdered solid fuel, which is efficient and effective; substantially increasing the speed of scarfing while, at the same time, considerably reducing the consumption of powder. Another object is to provide an improved powder dispenser which can be accurately adjusted over a relatively wide range. A further object is to provide means for discharging a relatively flat stream of powder in which the powder is substantially uniformly distributed thereacross. A still further object is to provide an improved semi-finished, stainless steel product.

According to the invention there is provided a novel process for thermochemically scarfing hard-to-scarf metal work with the aid of powdered solid fuel, which comprises applying a relatively flat stream of commercially pure oygen against the work surface at an acute dihedral angle, applying preheat to the work adjacent such oxygen stream; directing at least one separate, continuous relatively flat stream of a suitable carrier gas containing relatively fine powdered solid fuel toward such oxygen stream at an acute dihedral angle therewith, at a lower velocity than that of the oxygen stream, so that the powder merges with the leading fringe only of the oxygen stream on the way of the latter toward the work; and relatively moving the work and such streams along the path to be scarfed. The powdered solid fuel is uniformly distributed across the relatively flat carrier-gas stream, but does not enter into the main layer or core of the oxygen stream due to the higher velocity of the latter.

As a result, substantially all of the powdered solid fuel is heated to ignition temperature, and the so-heated particles then burn in the oxygen and liberate energy in the form of heat. Such liberated energy heats the metal being scarfed and the burning powder attacks such metal, raising the temperature and lowering the melting point of the surface material. As a result, the subsequent core of pure oxygen efficiently and effectively attacks the metal chemically and physically, removing a portion of the work surface. The reaction zone is then moved along a desired path to be scarfed at a relatively rapid rate, so that the work is thermochemically desurfaced.

Scarfing passes up to six times wider than was heretofore possible are accomplished by the invention at scarfing speeds which are two to three times faster, and with 25 to 75% less powder consumption. Production operations also show that the cost has been reduced as much as 50% compared with grinding.

More specifically, according to the invention, there is provided apparatus for thermochemically scarfing hard-to-scarf metal work with the assistance of powdered solid fuel, which comprises the combination of a blowpipe nozzle having a relatively flat continuous slot for discharging a stream of commercially pure oxygen against the work, and upper and lower rows of ports for discharging preheating flame supporting jets of gas adjacent such scarfing oxygen stream, and a novel powdered solid fuel nozzle mounted adjacent the blow-pipe nozzle. Such powdered solid fuel nozzle is provided with a relatively flat continuous slot for discharging the powdered solid fuel in a relatively flat stream of a suitable carrier gas separate from the scarfing oxygen, so that the powdered solid fuel first passes into the preheating flames, then against the scarfing oxygen stream, and finally against the work being scarfed. Means are associated with the powdered solid fuel nozzle for assuring uniform transverse distribution of the powder in the carrier gas upon its discharge.

There is also provided a process of forming a relatively flat or thin stream of relatively fine metallic powder in which the powder is substantially uniformly distributed across such stream, which comprises mixing the metallic powder with a stream of carrier gas, confining such stream to a longitudinal path, abruptly changing the direction of flow of the stream, confining the stream to a path of increasing width and decreasing thickness, and subsequently discharging the resulting flat stream in which the powder is uniformly distributed transversely thereof, at an exit velocity of between 30 and 350 feet/second through a relatively narrow slot which is between 0.0150 and 0.0625 inch thick.

Adjustable powder dispenser means are also provided for supplying a selected amount of powdered solid fuel in a carrier gas, at a selected flow rate of the carrier gas, such rate and amount being independently adjustable over relatively wide ranges.

The remarkable increase in process efficiency and speed with external feed, according to the invention, is probably the result of providing a higher degree of oxidation of the adjuvant powder. This may be explained on the basis that, in scarfing according to the invention with externally fed powder, the transfer velocity of the powder from the powder nozzle to the work is much lower than with the prior internal feed; allowing more time for the powder to reach ignition temperature, and leaving a layer of scarfing oxygen of higher velocity that is relatively pure and free of powder. Of even greater importance in quickly and efficiently bringing the powder up to the ignition temperature is the introduction of the powder into or through the preheat flames. On the other hand, with the prior internal feed, the powder was carried to the reaction zone in the relatively cold scarfing oxygen stream, thus contaminating the latter and providing no opportunity for advance ignition and, in addition, a considerable portion of the powder was carried in the trailing edge of the oxygen stream, where complete combustion was not accomplished. With external powder feed, according to the invention, however, most of the powder is thrown toward the work in advance or in the leading edge of the oxygen stream in such manner that there is a lesser penetration of the oxygen stream and greater concentration of the reacting powder at the leading edge of the oxygen stream which is then exposed to oxidation by the main body of the oxygen stream which is substantially pure and uncontaminated. As a result a relatively pure layer or wedge of scarfing oxygen follows and cleans up the reaction wave in advance thereof. The uniform cross-distribution of the powder also greatly aids complete combustion of the powder where this accomplishes the most good.

The resulting semi-finished product is a stainless steel body having a relatively thin surface scale consisting of a complex oxide having a relatively high ferrosoferric oxide content that is substantially free of admixed metallic particles, which body also is substantially free of adherent metallic particles. "Shiners" are eliminated, so that grinding is unnecessary.

In the drawing:

Fig. 1 is a view mainly in side elevation, parts being broken away and shown in section, of a scarfing machine illustrating the invention;

Fig. 2 is a view mainly in front elevation of the apparatus shown in Fig. 1;

Fig. 3 is an enlarged fragmentary perspective view of the nozzle portion of such apparatus;

Fig. 4 is an enlarged fragmentary detail, mainly in cross-section, showing how the gas mixture is supplied to the preheating gas ports;

Fig. 5 is a flow diagram of the novel powder dispenser system of the invention;

Figure 6:
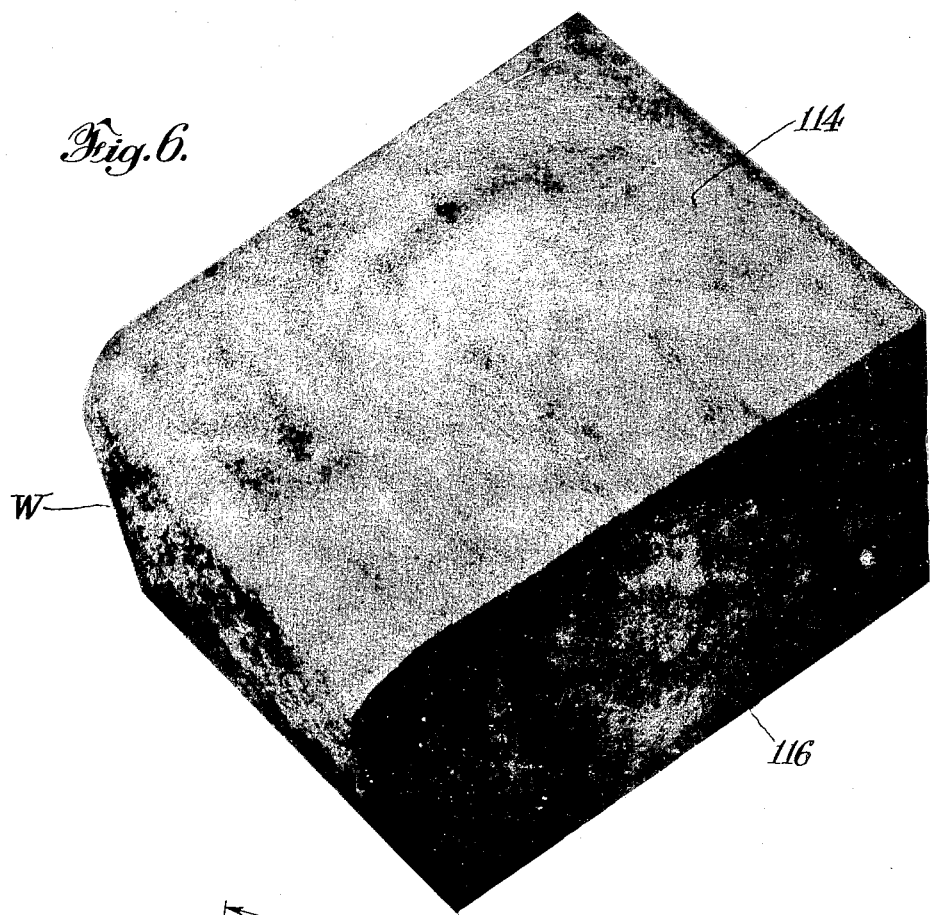
Fig. 6 is a perspective view of a stainless steel body scarfed according to the invention.

As shown in the drawings, the illustrated machine scarfing apparatus S is mounted on a suitable support F above the path of the work W, such as a cold slab of stainless steel, to be scarfed. The apparatus S includes a relatively flat powder nozzle 10 mounted on a modified scarfing nozzle 12 of conventional construction, like that disclosed in Patent No. 2,483,479 to H. T. Smith et al., for example. The nozzle 12 is preferably of the wide-continuous-slotted type having a relatively wide slot 14 for discharging a relatively flat stream 20 of commercially pure oxygen against the work W, as well as upper and lower rows of ports 16 and 18 for discharging preheating-flame supporting jets of premixed oxy-acetylene gas adjacent such scarfing oxygen stream. The burning gas jets merge into preheating flames 22 and 24 which extend above and below the oxygen stream 20, forming dihedral angles with the work surface 25.

Oxygen is supplied to the nozzle 12, for example, from a suitable source of oxygen under pressure, by way of a supply pipe 26, a manifold 28 and a battery of tubes 30. At the same time, a suitable combustible mixture of oxygen and acetylene, or other fuel gas, is supplied to the preheating flame ports 16 and 18 by way of gas pipes 32 which are connected to suitable gas mixers and supplies of oxygen and fuel gas under pressure.

The powder nozzle 10 is mounted by a suitable bracket 33 directly on the blowpipe nozzle 12, and comprises a metal base 34 and a metal cover 36 secured together by bolts 38. The base 34 and the cover 36 are provided with a channel, or mating channels, forming a slot 40 for discharging a suitable relatively flat powder-laden carrier gas stream 39, which can be any suitable gas, such as air, or nitrogen, or oxygen, for example. The discharge face of the powder nozzle 10 is tapered and positioned on the blowpipe nozzle 12 so that slot 40 discharges the separate powder-laden carrier gas stream 39 from a flat orifice 41 located directly above the front-upper edge of the nozzle 12. The powder-laden gas stream 39 forms a dihedral angle with the oxygen stream 20, and with the work surface 25.

The upper and lower walls of the slot 40 diverge slightly upstream, and the upper end of the slot is in communication with the outlet end of a novel powder distributor 42 made of sheet-metal in the form of a fishtail which is supported in front of the oxygen manifold 28 by a bracket 44. The interior of the powder distributor 42 has side walls 46 which diverge in the direction of the powder flow, and front and rear walls 48 which gradually converge in the direction of such flow.

The illustrated powder distributor 42 is provided at the upper end thereof with an angulated tubular inlet 50 for assisting in the proper distribution of powder transversely of the carrier gas stream. Such inlet 50 is connected by a hose 51 to a novel powder-laden carrier-gas supply system. As shown in Fig. 5, the powder-laden carrier-gas supply system includes a novel powder dispenser 52 in the form of a gas-tight hopper containing a suitable supply of solid-fuel powder P, in this case relatively fine ferrous metal powder. The powder dispenser 52 comprises a suitable cover 54 provided with a gas pressure relief valve 56. The dispenser is supported by legs 58 and has a funnel-shaped bottom portion 60 which guides the powder P toward an outlet from which depends a flexible tube 62 provided with a pinch-type shut-off valve 64 which is connected to a diaphragm 66 by a rod 68.

The powder supply system is designed so that the powder flow from the dispenser 52 through the outlet 62 and valve 64, can be adjusted over a relatively wide range independently of the carrier or transporting gas flow from the dispenser outlet to the powder nozzle 10, so that the rate of the gas flow also can be adjusted over a relatively wide range, and the powder hose 51 and the powder nozzle can be purged of powder with the gas, when the powder flow is turned off by closure of the valve 64. The powder flow is initiated or arrested by manipulating a remotely located switch 72 in an electric supply circuit 74 containing a solenoid 76 which operates a three-way valve 78 in a compressed air line 80 which is connected by an inlet pipe 82 to a suitable source of air under pressure. The outlet of the line 80 is connected to one side of the diaphragm 66. In one position of the valve 78 air under pressure is supplied to the diaphragm 66, causing the valve 64 to close; while in its other position the valve 78 shuts off the air inlet pipe 82 and connects the pipe 80 to an air exhaust pipe 84, causing the valve 64 to open.

The carrier gas from a suitable source of supply under pressure, enters the system through an inlet pipe 86 and is split into two unequal streams by a T-fitting 88. The smaller stream flows through a pipe 90 containing a gas pressure regulator 92, the outlet end of the pipe 90 being connected to the interior of the dispenser 52 above the powder P. Here the carrier gas exerts a positive pressure on the top of the powder P. The main carrier gas stream, however, flows through a suitable pipe 93 containing a gas pressure regulator 94 and a critical orifice flowmeter 96 which, with regulator 94, controls the main powder transporting gas stream finally entering a chamber 98 on the downstream side of the powder dispenser 52.

The powder flow rate is controlled by the size of the orifice or outlet 62 at the bottom of the dispenser, and the gas pressure differential across such orifice. The flow rate in pounds per minute is a substantially straight line function of this differential pressure which is indicated by a differential pressure gauge 100 in a pipe 102 having one end connected to the pipe 90 and other to the pipe 93. Gauge 100 measures the difference in pressure between space $P_H$ above powder P, and space $P_D$ in chamber 98. The pipe 102 is also provided with a hopper inlet pressure gauge 104 and a discharge pressure gauge 106. Actual powder flow may be determined by consulting a chart or curve based on the straight line function of the differential pressure.

Thus, each gas stream is controlled independently of the other. In this way the flow of carrier gas can be accurately adjusted without changing the flow of pressurizing gas to the hopper, and vice versa. This permits adjustment, at will, of the density of the powder-air mixture leaving the dispenser and also adjustment of the velocity of the powder, giving greater latitude to the control of all important variables.

In operation, the powder leaves the dispenser 52 through orifice 62, passing through the pinch-type diaphragm-operated valve 64—the on-off operation of which is controlled by the solenoid operated air valve 78. Leaving valve 64 the powder is picked up in chamber 98 by the carrier gas stream and enters, through the funnelled bottom outlet 107 thereof, the hose 51 leading to the "fishtail" powder distributor 42.

As pointed out above, the powder distributor 42 is provided with a tubular shaped inlet 50 which is angulated with respect to the distributor, so that the powder flow impinges at an abrupt angle against the back wall of the fan-shaped body proper of such distributor. This change of direction plus the flattening out of the passage, distributes the powder uniformly across the confined stream. The distributor contains a fan-shaped interior approach section terminating in an exit slot 110 which is in communication with the inlet end of the slot 40 in the powder nozzle 10, the parts being secured together in gas-tight relation by an escutcheon 112. The powder nozzle 10 which receives the powder which has been uniformly spread out by the action of the distributor 42 has downwardly convergent upper and lower walls in the slot 40 which discharges the powder through the exit orifice 41 which, in the illustrated apparatus, is about 0.03 inch by 6.00 inches in size, and then through the upper preheating flames 22 of the scarfing nozzle 12. In the present example the scarfing nozzle 12 is provided with a scarfing oxygen slot 14 which is also about 6.00 inches wide.

The following table discloses typical performance data for 6-inch and 2-inch wide scarfing equipment.

PERFORMANCE DATA

| Nozzle size | 6-inch unit | | 2-inch unit | |
|---|---|---|---|---|
| Cut depth, inches | .125 | .250 | .05 | .10 |
| Powder feed rate, lb./min | 9.0 | 7.0 | 2.5 | 2.5 |
| Powder consumption, lb./sq. ft. | 0.69 | 0.70 | 0.38 | 0.74 |
| Oxygen consumption, cu. ft./sq. ft. | 44 | 73 | 24 | 46 |
| Acetylene consumption, cu. ft./sq. ft. | 1.0 | 1.4 | 0.66 | 1.30 |
| Scarfing time, hr./sq. ft | .0013 | .0017 | .0025 | .005 |
| Scarfing speed, ft./min | 26 | 20 | 35 | 18 |
| Air flow, cu. ft./hr | 1,500 | 1,500 | 500 | 500 |
| Air velocity (discharge), ft./sec | 350 | 350 | 350 | 350 |

The following table discloses ratios for different units.

6-IN. UNIT

| Cut depth in. | Cu. ft. oxygen/ lb. powder | Cu. ft. acetylene/ lb. powder | Cu. ft. air/lb. powder |
|---|---|---|---|
| 0.125 | 44/0.69 = 63.8 | 1.0/0.69 = 1.45 | 1500/540 = 2.78 |
| .250 | 73/0.70 = 104.3 | 1.40/0.70 = 2.0 | 1500/420 = 3.57 |

2-IN. UNIT

| 0.05 | 24/0.38 = 63.2 | 0.66/0.38 = 1.74 | 500/150 = 3.33 |
| .10 | 46/0.74 = 62.2 | 1.30/0.74 = 1.76 | 500/150 = 3.33 |

In the illustrated apparatus (6" unit), at an exit velocity of between 30 and 350 feet/second, the impingement angle of the powder stream on the preheating flames, i. e., the optimum included angle between the powder nozzle 10 and the continuous slotted oxygen nozzle 12 is about 40°, when the exit velocity of the latter is between 500 and 850 feet/second. In other words, the slotted scarfing nozzle makes an optimum dihedral angle of 30° with the top surface of the work, and the powder nozzle makes an optimum dihedral angle of 70° with the top surface of the work.

Figure 7:
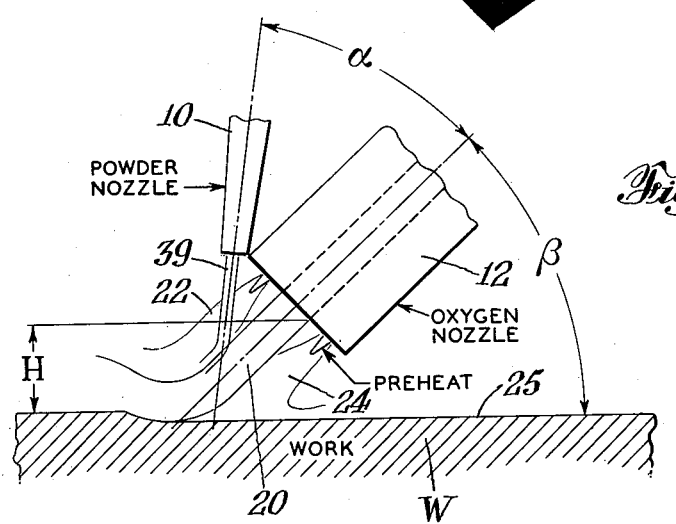
Fig. 7 is a diagram illustrating the relative dihedral angles of the work surface and streams in scarfing.

The following table, when considered in connection with Fig. 7, discloses optimum nozzle arrangements in connection with actual performance data of various units.

OPTIMUM DIHEDRAL ANGLES AND PERFORMANCE DATA

| | 6" unit | | 2" unit | | 1 15/64" unit | |
|---|---|---|---|---|---|---|
| $\beta$ degrees | 30 | | 30 | | 45 | |
| $\alpha$ do | 40 | | 20 | | 30 | |
| H inches | 5/8 | | 3/4 | | 1 3/4 | |
| Oxygen slot size inches | 6 × 13/32 | | 2 × 1/4 | | 1 15/16 × 3/16 | |
| Powder slot size do | 6 3/8 × 0.030 | | 2 3/8 × 0.030 | | 1 3/8 × 3/64 | |
| Cut depth in | .13 | .25 | .05 | .10 | .040 | .13 |
| Scarfing speed, F. P. M | 26 | 20 | 35 | 18 | 25 | 15 |
| Oxygen flow, C. F. H | 30,000 | 43,000 | 9,000 | 9,000 | 4,400 | 4,400 |
| Powder flow rate, lb./min | 9 | 7 | 2.5 | 2.5 | 1.5 | 1.5 |
| Preheat gas flow, C. F. H | 750 | 750 | 260 | 260 | 100 | 100 |

Actual tests with a 6-inch unit (having a slot width or thickness of between 0.0150 and 0.0625 inch) have revealed that the following ranges for the dihedral angles $\alpha$ and $\beta$ with respect to the top surface of the work W are possible (without consideration for quality, but with definite propagation of the scarfing cut):

| Angle ($\alpha+\beta$) powder nozzle | Angle ($\beta$) scarfing nozzle | Remarks |
|---|---|---|
| Degrees | Degrees | |
| 50 | 18 | Minimum. |
| 78 | 38 | Maximum. |

However, it is estimated that a range of 45 to 90° is workable for the powder nozzle-to-work angle and a range of 15 to 50° for the scarfing nozzle-to-work angle.

The following tables illustrate the composition and size of an example of the iron powder which has been used successfully according to this invention. Other examples can be found in Wagner 2,451,422.

CHEMICAL COMPOSITION

Percent
Free iron—At least _____ 85.00
Total carbon—Not over _____ .30
Residual material, balance.

PHYSICAL PROPERTIES

[Free from any contaminating materials as, for example, wooden splinters, fibers, or non-ferrous alloys of brass and bronze.]

*Screen size*

Percent
—100 on 200 mesh _____ 25
—200 on 325 mesh _____ 25
—325 _____ 50

Scarfing speeds (i. e., relative movement between the work and the scarfing unit) obtained according to this invention, that is to say, 15–50 feet/minute, are up to six times faster than when using a prior single nozzle powder scarfing machine with internal powder feeding. This is accomplished with 25 to 75% less powder consumption per unit of scarfed surface. The invention also eliminates "shiners" in stainless steel sheets rolled from slabs scarfed with powder consisting essentially of iron, without mechanically grinding the scarfed surface before final rolling. The invention, furthermore, results in a surface of good quality in the "as-scarfed" condition, i. e., such that it may be rolled into a finished shape, requiring a minimum of additional conditioning.

The scale 114 that remains adhering to the base metal 116 of the work W, Fig. 6, has a very high degree of oxidation. There is practically no FeO, and substantially or mainly all of such scale is $Fe_3O_4$. The oxidation products are substantially free of admixed metal (particularly iron or iron-rich metallic compounds). The scale layer may be classified as light. When the base metal 116 is stainless steel, its surface is relatively free of slag and shows only a typical melted condition of the surface on the order of magnitude of 0.005 inch, or less, in thickness. The base metal also is substantially free of metallic particles, deposited on, or adhering to its surface.

The scale 114 adhering to the base metal 116 is not tightly bonded; and has little tendency to adhere during subsequent heating, rolling and processing. Further, the scale is quite uniform in distribution, composition and adherence, and is of such a nature that subsequent heating and rolling produces practically no tendency to force the scale 114 into intimate contact with the base metal 116. Thus, the resulting product, when rolled, is free of "shiners," the mechanical grinding step being entirely eliminated. Furthermore, this is accomplished with considerably less powder at a much faster rate and substantially less cost than was possible prior to the invention.

Matter disclosed in the present case is claimed in my divisional application, Serial No. 281,841, filed April 11, 1952, for Refractory-Metal Body Scarfing Pneumatic Powder Dispensing Apparatus and Process.

I claim:

1. Process of desurfacing a refractory metal body, which comprises applying preheat to a local surface portion of such body, discharging a relatively flat stream of oxidizing gas at an acute angle against such heated portion, and discharging a separate continuous relatively flat stream of gas containing uniformly transversely distributed powdered solid fuel at an acute angle toward such oxidizing gas stream, so that the central planes of such streams in the direction of flow thereof form dihedral angles with one another and with such surface portion of the body, and relatively moving the body and such streams so that successive surface portions thereof are progressively removed thermochemically by the combined scarfing action of the powdered solid fuel and oxidizing gas stream.

2. Process of thermochemically scarfing a refractory metal body, which comprises applying a relatively flat stream of oxygen at an acute angle against a surface portion of such body, applying a preheating flame against such portion adjacent the oxygen stream, directing a continuous relatively flat stream of iron-powder laden gas in which the powder is uniformly distributed transversely thereof toward such oxygen stream at an acute angle, said relatively flat streams of oxygen and iron-powder laden gas forming dihedral angles with each other and with such surface portion, the velocity of the iron-powder laden gas stream before the powder enters such flame being less than that of the oxygen stream, and relatively moving the body and such streams so that successive portions of the surface are progressively scarfed thereby.

3. Process of conditioning the surface of a cold stainless steel body, which comprises simultaneously scarfing a surface portion from such body and leaving the scarfed surface with a relatively thin complex oxide scale which contains a relatively high content of ferrosoferric oxide, which body is substantially free of adherent metallic particles, by simultaneously directing toward such surface portion at acute dihedral angles with respect to each other and such surface portion, a relatively flat stream of commercially pure oxygen and a separate continuous relatively flat stream of relatively fine iron powder, said oxygen stream being sandwiched between adjacent preheating flames, and the iron powder being uniformly distributed across such stream thereof, whereby combustion of such iron powder takes place in the fringe of oxygen adjacent and ahead of such surface portion as the latter is scarfed, leaving such metallic particle-free scale on the scarfed surface.

4. In the art of thermochemically scarfing work composed of metal having a refractory oxide surface, such as stainless steel, with the aid of ferrous metal powder, the improvement which comprises directing at an exit velocity of between 500 and 850 feet/second a relatively flat stream of commercially pure oxygen against a surface portion of the work to be scarfed at an acute dihedral angle with respect to such surface portion, directing a preheating flame toward such portion, directing externally of said oxygen stream at an exit velocity of between 30 and 350 feet/second a separate continuous relatively flat stream of uniformly transversely distributed ferrous metal powder toward the leading surface of such oxygen stream at acute dihedral angles with respect to said oxygen stream and such surface portion, and relatively moving the body and such streams at a speed of between 12 and 50 feet/minute, whereby most of the ferrous metal powder burns in the oxygen at the front of the portion which is subsequently removed by the main stream of oxygen, leaving a scarfed surface which is substantially free of adherent metallic particles.

5. In the art of thermochemically scarfing work composed of refractory metal with the aid of ferrous metal powder, the improvement which comprises directing a relatively flat stream of commercially pure oxygen against a surface portion of the work to be scarfed at an acute dihedral angle with respect to such surface portion, directing a preheating flame toward such portion, directing externally of said oxygen stream a separate continuous relatively flat stream of uniformly transversely distributed ferrous metal powder toward the front surface of such oxygen stream at acute dihedral angles with respect to said oxygen stream and such surface portion, and relatively moving the body and streams, whereby the ferrous metal powder burns in the oxygen at the front of the portion which is subsequently removed by the main stream of oxygen, leaving a scarfed surface which is substantially free of adherent metallic particles.

6. In the art of thermochemically scarfing work composed of refractory metal with the aid of combustible metal powder, the improvement which comprises directing a stream of commercially pure oxygen against a surface portion of the work to be scarfed at an acute angle with respect to such surface portion, directing externally of said oxygen stream a separate continuous stream of combustible metal powder toward the leading surface of such oxygen stream at acute angles with respect to said oxygen stream and such surface portion, the metal powder being substantially uniformly distributed transversely of the flow thereof, and relatively moving the body and such streams, whereby the metal powder burns in the oxygen at the work surface directly in front of the portion which is subsequently removed by the main stream of oxygen, leaving a scarfed surface which is substantially free of adherent metallic particles.

7. Apparatus for thermochemically scarfing stainless steel work with the assistance of relatively fine ferrous metal powder, which comprises the combination of means for applying a relatively flat stream of commercially pure oxygen and preheating flames obliquely against and along the work surface at an acute dihedral angle relative thereto, and means for simultaneously applying a relatively flat stream of uniformly transversely distributed relatively fine ferrous metal powder obliquely toward such work surface at a different acute dihedral angle relative thereto, whereby the work surface is thermochemically scarfed by the combined action of such preheating flame, oxygen, and ferrous metal powder.

8. Apparatus for thermochemically scarfing refractory metal work with the assistance of powdered solid fuel, which comprises means for applying a relatively flat stream of oxygen against the work at an included acute dihedral angle with the work surface, means for preheating the work surface adjacent such oxygen stream, and means for directing a separate continuous relatively flat stream of carrier gas containing uniformly transversely distributed relatively fine solid fuel powder toward the work surface at an included acute dihedral angle therewith.

9. Apparatus for thermochemically scarfing refractory metal work with the assistance of relatively fine adjuvant powder, which comprises the combination of a blow-pipe nozzle having a relatively wide continuous slot for discharging a relatively flat stream of scarfing oxygen against the work, and upper and lower rows of ports for discharging preheating flame supporting jets of combustible gas adjacent such oxygen stream, and a powder-laden gas nozzle having a relatively wide continuous slot for discharging a continuous relatively flat stream of carrier gas containing uniformly transversely distributed relatively fine powder first through at least one row of such flames, then against such oxygen stream and finally against the work.

10. Apparatus for thermochemically scarfing metal work with the assistance of relatively fine ferrous metal powder, comprising a powder-laden gas nozzle having a relatively wide continuous slot for discharging a continuous relatively flat stream of gas containing uniformly transversely distributed relatively fine metallic powder against the work, said slot having upper and lower walls which diverge upstream, and a fan-shaped distributor connected to said nozzle, said distributor having side walls which converge upstream, and front and rear walls which diverge upstream with respect to the powder flow, so that the powder is uniformly distributed in the carrier gas stream which is finally discharged from such slot, and metallic powder-laden gas supply means connected to the upper end of said fan-shaped distributor.

FRED MOESINGER, Jr.

REFERENCES CITED

The following references are of record in the file of this patent:

UNITED STATES PATENTS

| Number | Name | Date |
| --- | --- | --- |
| 851,668 | James | Apr. 30, 1907 |
| 2,042,428 | Krekeler | May 26, 1936 |
| 2,137,968 | Tanner | Nov. 22, 1938 |
| 2,267,405 | Jones et al. | Dec. 23, 1941 |
| 2,327,337 | Burch et al. | Aug. 24, 1943 |
| 2,444,899 | Meincke et al. | July 6, 1948 |
| 2,444,900 | Meincke et al. | July 6, 1948 |
| 2,451,422 | Wagner | Oct. 12, 1948 |
| 2,465,978 | Meincke et al. | Mar. 29, 1949 |
| 2,470,819 | Hughey | May 24, 1949 |
| 2,470,999 | Meincke | May 24, 1949 |
| 2,483,479 | Smith et al. | Oct. 4, 1949 |
| 2,487,974 | Kirk | Nov. 15, 1949 |
| 2,493,802 | Bucknam et al. | Jan. 10, 1950 |
| 2,513,303 | Feild | July 4, 1950 |